United States Patent
Srinivasan et al.

(10) Patent No.: US 11,509,592 B2
(45) Date of Patent: Nov. 22, 2022

(54) DYNAMIC NETWORK RECEIVER-DRIVEN DATA SCHEDULING OVER A DATACENTER NETWORK FOR MANAGING ENDPOINT RESOURCES AND CONGESTION MITIGATION

(71) Applicant: Microsoft Technology Licensing, LLC, Redmond, WA (US)

(72) Inventors: Arvind Srinivasan, San Jose, CA (US); Nisheeth Srivastava, Sammamish, WA (US); David Andreas Sidler, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/170,502

(22) Filed: Feb. 8, 2021

(65) Prior Publication Data
US 2022/0255872 A1    Aug. 11, 2022

(51) Int. Cl.
*H04L 12/58*    (2006.01)
*H04L 47/26*    (2022.01)

(52) U.S. Cl.
CPC .................................. *H04L 47/26* (2013.01)

(58) Field of Classification Search
CPC ....................................................... H04L 47/26
See application file for complete search history.

(56) References Cited

U.S. PATENT DOCUMENTS

| | | | |
|---|---|---|---|
| 9,047,760 B2* | 6/2015 | Ali | H04Q 9/00 |
| 2014/0164641 A1 | 6/2014 | Ye et al. | |
| 2019/0155662 A1* | 5/2019 | Kuno | G06F 9/5083 |
| 2020/0333756 A1* | 10/2020 | Weik, III | G05B 19/0426 |

OTHER PUBLICATIONS

"IEEE 802 Nendica Report: The Lossless Network for Data Centers", In IEEE-SA Industry Connections White Paper, Aug. 18, 2018, 29 Pages.
"International Search Report and Written opinion Issued in PCT Application No. PCT/US2022/013036", dated Apr. 22, 2022, 11 Pages.

* cited by examiner

*Primary Examiner* — Esther B. Henderson
*Assistant Examiner* — Nazia Naoreen
(74) *Attorney, Agent, or Firm* — Fiala & Weaver P.L.L.C.

(57) ABSTRACT

A network endpoint receiver controls packet flow from a transmitter. Packets are received via a network in packet traffic according to a push mode, where the transmitter controls pacing of transmitting the packets. Characteristics related to the packet traffic are monitored at the receiver. The monitored characteristics are compared to reception performance parameters, and based on the comparison, a decision is made to switch from the push mode to a pull mode for controlling the packet flow. The receiver transmits a pull mode request packet to the transmitter, where the pull mode request packet indicates a pacing of subsequent packets transmitted by the transmitter to the receiver in accordance with the pull mode. Pacing of further transmitted packets may be controlled by subsequent pull mode request packets sent over time to the transmitter by the receiver. Similarly, the receiver may control additional transmitters to transmit at equal or different rates.

20 Claims, 8 Drawing Sheets

DYNAMIC NETWORK RECEIVER-DRIVEN DATA SCHEDULING OVER A DATACENTER NETWORK FOR MANAGING ENDPOINT RESOURCES AND CONGESTION MITIGATION

BACKGROUND

In most network transport protocols a network transmitter is responsible for pacing packet traffic. The transmitter may monitor congestion events and pace message transmissions based on policy that may be set by a higher level system. In some transport protocols, incast traffic at a receiver, where packets are received from multiple transmitters (e.g., a many-to-one communication pattern), may be managed using high latency rendezvous based network handshakes. This approach can be expensive, especially for networks with a large radius and round trip time (RTT). To use this technique, a transmitter and the application that initiates a message must have an apriori knowledge of the message size and the RTT of the network. While RTT may be constant in an over-provisioned network, when a network is not fully provisioned, RTT may vary quite a bit, which can impact network communication performance.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer readable mediums that store code for performing methods are described herein. In one aspect, a method is performed in a network endpoint receiver for controlling packet flow by the receiver of the network endpoint. Packets are received in packet traffic that is transmitted over a network by a transmitter according to a push mode such that the transmitter controls pacing of packet transmissions over the network to the receiver. One or more characteristics related to the packet traffic are monitored. The monitored one or more characteristics are compared to reception performance parameters. A decision to switch from the push mode to a pull mode is made based on the comparing. A pull mode request packet is transmitted to the transmitter, where the pull mode request packet indicates a pacing of subsequent packet transmissions by the transmitter over the network to the receiver according to the pull mode.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
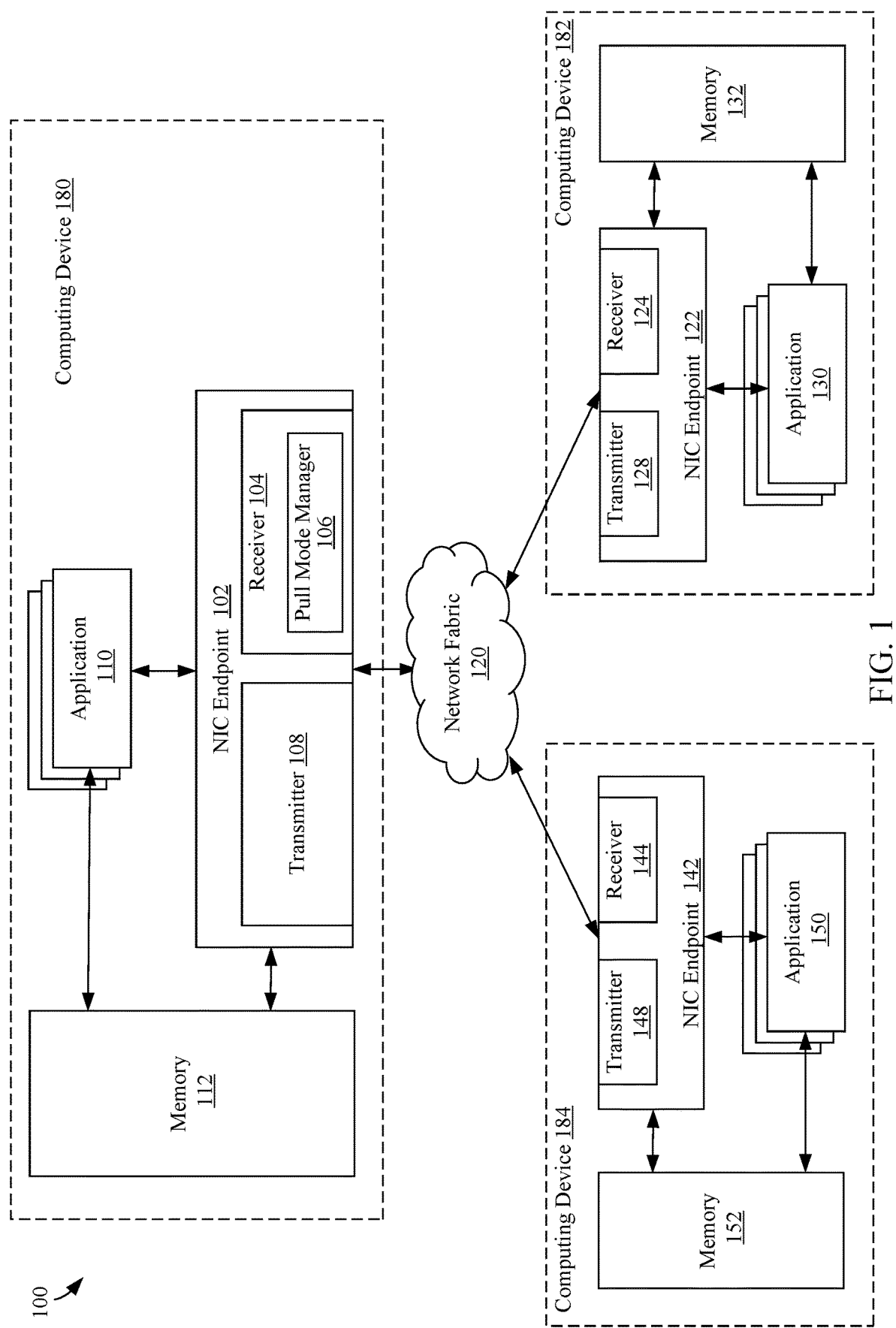
FIG. 1 is a block diagram of a system for conducting dynamic pull mode control of packet traffic pacing by a receiver of a network interface controller (NIC) endpoint, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

The present disclosure is related to congestion management for reliable transport running on an unreliable data center network. As described above, in most network transport protocols, the network transmitter is responsible for pacing packet transmissions. The receiver may communicate congestion events back to the transmitter in the form of an acknowledgment (ACK), negative acknowledgment (NACK), or a congestion notification packet (CNP).

A rendezvous based network handshake is a technique utilized to manage incast at the receiver, however the latency introduced by this type of handshake can be expensive for a network with a large radius and round trip time. To use this technique, the transmitter and originating application are burdened with acquiring and using apriori knowledge of message size and round trip time (RTT) of the network. In an over provisioned network, the round trip time may be constant, however when networks are not fully provisioned, round trip time can vary, and thus, impact performance.

The present disclosure describes embodiments for a high-performance network transport protocol designed to realize high goodput (i.e., the rate of useful information bits, which may not include retransmitted packets or overhead bits), and recover data losses due to congestion events, in a very efficient manner. Embodiments solve the incast problem at the receiver without burdening the application with acquiring apriori knowledge of the network RTT or the message size. In addition, embodiments may be used to resolve congestion at the endpoint due to resource constraints and resource utilization.

Embodiments for implementing dynamic receiver control for pacing of packet transmissions may be implemented in various ways. For example, FIG. 1 is a block diagram of an system 100 for conducting dynamic pull mode control of packet traffic pacing by a receiver of a network interface controller (NIC) endpoint, according to an example embodiment. As shown in FIG. 1, system 100 includes a computing device 180, a computing device 182, a computing device 184, and a network fabric 120. Computing device 180 includes a NIC endpoint 102, an application 110, and a memory 112. NIC endpoint 102 includes a receiver 104 and a transmitter 108. Receiver 104 includes a pull mode manager 106. Computing device 182 includes a NIC endpoint 122, an application 130, and a memory 132. NIC endpoint 122 includes a receiver 124 and a transmitter 128. Computing device 184 includes a NIC endpoint 142, an application 150, and a memory 152. NIC endpoint 142 includes a receiver 144 and a transmitter 148. System 100 is described in detail as follows.

As described in more detail below with respect to FIG. 13, computing devices 180, 182, and 184 may each comprise any suitable computing device and/or any suitable network interface controller of a computing device, such as a stationary computing device (e.g., a desktop computer or personal computer), a mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system; a Microsoft® Windows phone, etc.), a wearable computing device (e.g., a head-mounted device including smart glasses such as Google® Glass™, Oculus Rift® by Oculus VR, LLC, etc.), a gaming console/system (e.g., Nintendo Switch®, etc.), an appliance, a set top box, etc.

NIC endpoints 102, 122, and 142 may each comprise a network interface controller with a transmitter and/or receiver configured to connect to and communicate over one or more networks, such as a local area network (LAN), a wireless LAN (WLAN), and/or a wide area network (WAN). For example, network fabric 120 may comprise a platform or network topology where nodes, such as switches and endpoints, are interconnected to other nodes and are configured to communicate based on any suitable communication protocols. In one example, network fabric 120 comprises an Ethernet network where industry-standard protocols and Ethernet switches are utilized to communicate messages between NIC endpoints 102, 122 and/or 142. NIC endpoints 102, 122, and/or 142 may each have a transport protocol service to provide reliability for unreliable data center networks. To provide the reliability service, each NIC endpoint (e.g., NIC endpoint 102) may use hardware resources that may be shared among multiple packet flows. Some of the resources that may be assigned per packet flow may comprise off-chip random access memory (RAM) packet buffers including available bandwidth (e.g., temporal or sustained), hardware contexts such as pointers, timers, etc., which may be used for tracking selective acknowledgements (e.g., SELACK), missing packets (e.g., NACKs), reorder engines, and connection tracking states (e.g., connection tracking tables).

Application 130 may comprise a software application that is configured to communicate, via NIC endpoint 122 and network fabric 120, with application 110 via NIC endpoint 102. For example, NIC endpoint 122 may be configured to format messages from application 130 for transport over network fabric 120 to receiver 104. Similarly, application 150 may be configured to communicate, via NIC endpoint 142 and network fabric 120, with application 110 via NIC endpoint 102. Receiver 104 may be configured to receive packet traffic from transmitter 128 and/or transmitter 148, via network fabric 120, which is destined for application 110. Transmitter 108 may be configured to transmit packet traffic to receiver 124 and/or receiver 144, via network fabric 120, which is destined for application 130 and/or 150 respectively. Computing devices 180, 182, and/or 184 may each be configured to process multiple applications that communicate via network fabric 120. In some embodiments, NIC endpoints 102, 122, and/or 142 may comprise one or more local CPUs (not shown).

Memory 112, memory 132, and/or memory 152 may each comprise one or more memory devices. NIC endpoint 102 may share memory 112 with application 110, or memory 112 may comprise separate memory devices for use by NIC endpoint 102 and application 110. In some embodiments memory 112 or a portion of memory 112 may be external to computing device 180. Various forms of memory that may be utilized in system 100 are described in more detail below with respect to FIG. 13.

Pull mode manager 106 may be configured to monitor one or more characteristics related to packet traffic received by receiver 104 via network fabric 120, and compare the monitored characteristics to various reception performance parameters (e.g., performance thresholds) configured for receiving and processing packet traffic at receiver 104. Pull mode manager 106 may decide to switch packet transmission pacing control from a push mode to a pull mode or from a pull mode to a push mode based the comparisons. Pull mode manager 106 may be implemented in various ways, for example, as a hardware level state machine implemented with logic gates, an embedded processor that executes firmware code, a local CPU, and/or a main CPU of computing device 180 (not shown). Pull mode manager 106 is described in more detail below.

Figure 2:
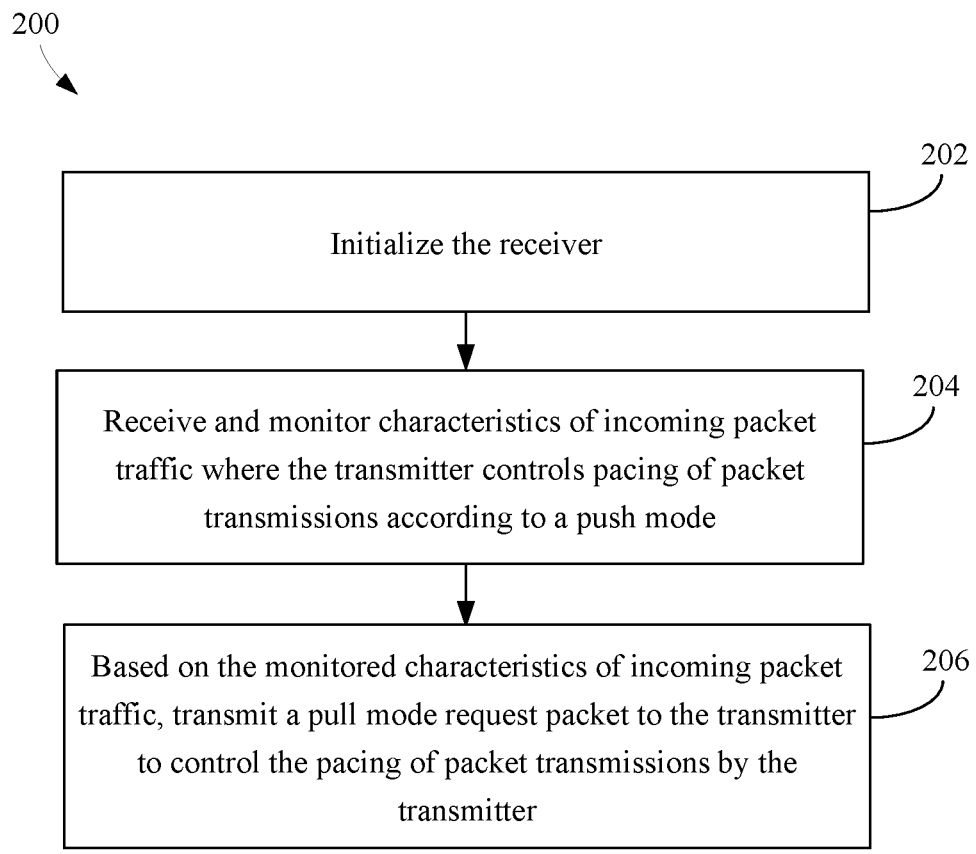
FIG. 2 is a flowchart of a method for a receiver of a network interface controller endpoint to dynamically control packet transmissions from a transmitter, according to an example embodiment.

Receiver 104 may operate in various ways to perform its functions. For instance, FIG. 2 is a flowchart 200 of a method for an endpoint receiver to dynamically control packet transmissions from a transmitter, according to an example embodiment. In an embodiment, receiver 104 may operate according to flowchart 200. Flowchart 200 is described as follows with reference to FIGS. 1 and 3.

Figure 3:
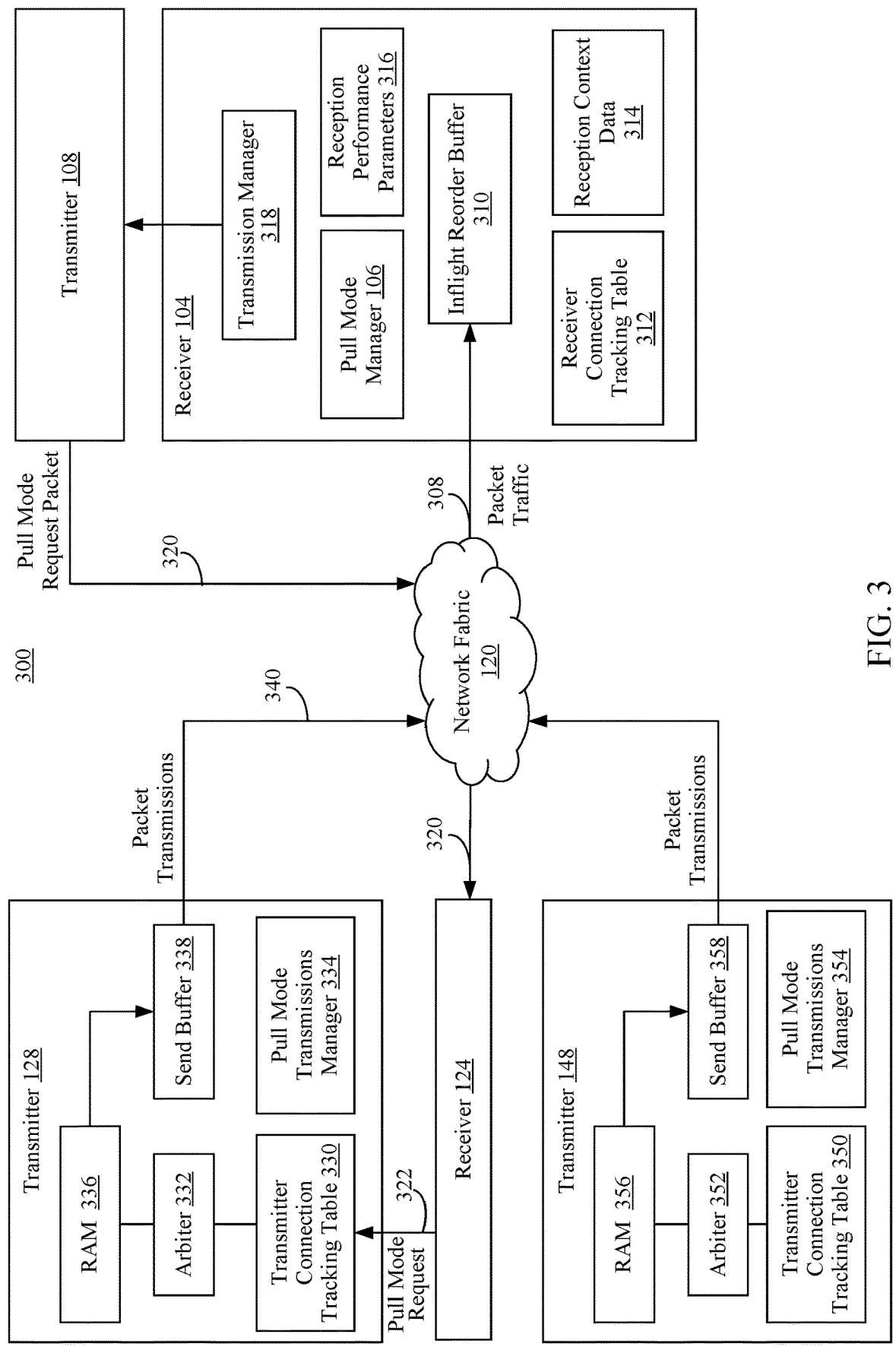
FIG. 3 is a block diagram of a system comprising a receiver with a pull mode manager for dynamically controlling the pacing of packet transmissions to the receiver, according to an example embodiment.

FIG. 3 is a block diagram of a system 300 comprising a receiver with a pull mode manager for dynamically controlling the pacing of packet transmissions to the receiver, according to an example embodiment. For example, system 300 includes receiver 104, transmitter 108, network fabric 120, receiver 124, transmitter 128, and transmitter 148. Receiver 104 includes pull mode manager 106, an inflight reorder buffer 310, a receiver connection tracking table 312, reception context data 314, reception performance parameters 316, and a transmission manager 318. Transmitter 128 includes a transmitter connection tracking table 330, an arbiter 332, a pull mode transmissions manager 334, RAM 336, and a send buffer 338. Transmitter 148 includes a transmitter connection tracking table 350, an arbiter 352, a pull mode transmissions manager 354, RAM 356, and a send buffer 358. Also shown in FIG. 3 are packet traffic 308, a pull mode request packet 320, a pull mode request 322, and packet transmissions 340. In some embodiments system 300 may be implemented in system 100. For purposes of illustration, system 300 is described in detail as follows with respect to flowchart 200 of FIG. 2.

In general, receiver 104 may comprise any suitable logic, circuitry, interfaces, and/or code that may be configured to receive, via one or more ports, and/or process, packets from transmitters of one or more other NIC endpoints such as NIC endpoint 122 and/or NIC endpoint 142. In some embodiments, one or more applications of computing device 180 (e.g., application 110) may be configured to communicate messages concurrently with one or more applications of computing device 182 (e.g., application 130) and/or one or more applications of computing device 184 (e.g., application 150).

Flowchart 200 begins with step 202. In step 202, a receiver is initialized. For example, a configuration management agent (not shown) of the NIC endpoint 102 may be configured to configure available resources based on a number of possible senders or transmitters. Receiver 104 resources may include, for example, receiver connection tracking table 312, packet buffers such as inflight reorder buffer 310, and the number of reorder states to be tracked based on packet drops, which may be limited by capacity and/or bandwidth. Reception performance parameters 316 may be configured to include, for example, thresholds for the number of allowed packets dropped at the receiver, burst rate, network congestion events, resource usage, etc. A configuration management agent of the NIC endpoints 182 and 184 may be configured to initialize transmitter 128 and/or transmitter 148 respectively. For example, transmitter resources may be configured, such as, transmitter connection tracking tables 330 and/or 350, packet buffers such as RAM 336 and/or 356, and send buffers 338 and/or 358. Some of the configuration information may be shared across multiple transmitters or receivers.

In step 204, incoming packet traffic may be received and characteristics of the incoming packet traffic may be monitored, where the transmitter controls pacing of packet transmissions according to a push mode. For example, packets transmitted from transmitter 128 and/or transmitter 142 to receiver 104 may be sent in an eager manner, at least initially. In this regard, the packets may be "pushed" towards the receiver by the transmitter. When transmitters and receivers of system 300 operate in the push mode (i.e., the eager manner), the transmitters may determine transmission rates to pace packet transmissions based on policy provided by higher level software (e.g., of NIC endpoint 122 or computing device 182). For example, in the push mode, receiver 104 may track incoming traffic and compare characteristics of the traffic against programmed thresholds. Notifications from receiver 104 to transmitter 128, such as SELACK and NACK, may be generated based on inflight reorder buffer 310 capability or capacity among other things.

Under some circumstances, messages sent from application 130 or application 150 to application 110, may be transmitted in their entirety using a push mode only. For example, push-mode-only messages may be transmitted in packets at a rate set by the transmitter (e.g., transmitter 128 or 148 respectively). In some embodiments, push-mode-only messages be shorter messages that may have a length below a specified threshold, or messages that have latency sensitivity determined to be above a certain level, and therefore may be transmitted in their entirety using the push mode control of packet transmissions.

In general, a connection may be established between a transmitter and receiver (e.g., transmitter 128 and receiver 104), where a connection state is maintained on each side of the connection to keep track of resources utilized for the connection and the progress of packet transmissions and packet reception. For example, transmitter 128 may receive a request from application 130 to transmit information, or a message, to application 110. In response, transmitter 128 may subdivide the message and format message data into packets for transmission. Transmitter 128 may configure a connection for the message comprising connection information in transmitter connection tracking table 330. If an appropriate connection has already been established, application 130 may indicate to the transport layer, which existing connection from transmitter connection tracking table 330 to use for the requested transmission of the information or message. A connection may be identified in a connection tracking table (e.g., transmitter connection tracking table 330 or receiver connection tracking table 312) by a connection identifier (ID), a table index, a connection handle, etc. A connection that is populated in the transmitter connection tracking table 330 may include information or metadata such as the connection ID, an originating application ID, a destination application ID, an address of the originating transmitter, a destination address of the receiver, a message ID, etc. Various information from the transmitter connection tracking table 330 and/or additional information may be populated as header information in packets transmitted to receiver 104 in order to navigate the packets to the correct receiver and share information about the connection with the receiver. The packets to be transmitted (or retransmitted) may be stored in send buffer 338 and transmitted as packet transmissions 340 via network fabric 120. Receiver 104 may receive the transmitted packets in packet traffic 308, store the packets in inflight reorder buffer 310, and populate receiver connection tracking table 312 with the metadata or packet header information of the received packets. In this manner transmitter connection tracking table 330 and receiver connection tracking table 312 may comprise much of the same information regarding each connection between transmitter 128 and receiver 104. Receiver 104 may also populate reception context data 314 with additional information about the received packets of the connection, such as a transmission rate utilized, received packet size, received packet sequence numbers, missing packet sequence numbers, and/or network congestion information.

When a packet is received by receiver 104, a connection ID and/or destination application ID within the header of the packet may be matched to the same information in the receiver connection tracking table 312, and data from the received packet may be forwarded to the identified application (e.g., application 110). Receiver 104 may generate acknowledgements, such as SELACKs and/or NACKs for packets, and send the acknowledgements to transmitter 128 via transmitter 108, network fabric 120, and receiver 124. Transmitter 128 may utilize the acknowledgements to determine when to retransmit packets and which packets to retransmit.

In step 206, based on the monitored characteristics of incoming packet traffic, a pull mode request packet is transmitted to the transmitter to control the pacing of packet transmissions by the transmitter. For example, pull mode request manager 106 may monitor characteristics of incoming traffic and determine a preferred transmission rate to be used for the transmission of packets of a connection from a transmitter (e.g., from transmitter 128 or 148) to receiver 104. The characteristics of incoming traffic may be stored with reception context data 314 and may include network congestion events, burst rate, packet drops, packet handling resource usage (e.g., resource usage for receiver 104 such as packet buffers, available bandwidth, reception context table resources, timers, pointers, reorder engines, connection tracking states, peripheral component interconnect express (PCIe) bus capacity, etc.), etc. The characteristics of incoming traffic may be compared to reception performance parameters 316 (e.g., network congestion events, a burst rate, packet drops at the receiver, resource usage at the receiver, etc.). When a threshold has been violated (e.g., resource usage, network congestion, and/or the number of dropped packets is too high), pull mode manager 106 may be configured to determine an appropriate rate for packet transmissions, and transmit a pull mode request packet 320 to transmitter 128 via transmitter 108, network fabric control 120, and receiver 124 to control the pacing of packet transmissions (e.g., regulate a transmission rate or control other aspects of transmitting packets) by transmitter 128 to receiver 104. In some embodiments, rather than sending pull mode control information in a separate packet used only for the pull mode request, the pull mode request control information may be included as part of another type of packet being transmitted to transmitter 108, for example, an acknowledgement (ACK) packet. Such an ACK packet, or other type of packet that carries the pull mode control information, may be referred to as the pull mode request packet 320. Over time, multiple pull mode request packets 320 may be sent to transmitter 128 such that the transmission rate may be updated over time. Moreover, pull mode manager 106 may monitor packet traffic over other connections from one or more additional transmitters (e.g., transmitter 148 and/or other transmitters), and transmit other pull mode request packets 320 to those transmitters to control their packet transmission rates and other aspects of transmissions.

More broadly speaking, transmissions for a connection may initially begin in a push mode at a rate determined by the transmitter. The receiver, based on a certain criteria, can dynamically switch into a mode where it issues a pull mode request packet to the transmitter. The pull mode request may request or allocate a desired transmission rate, or bandwidth, to the transmitter based on packet traffic characteristics seen by the receiver. The pull mode request may control the transmitter to alter its packet transmission pacing (e.g., its transmission rate or bandwidth). By dynamically switching the handshake from the push mode (i.e., the eager mode) to a pull mode, the receiver effectively controls the rate at which it receives and/or consumes data. The receiver may transmit individual pull mode requests to multiple transmitters, and thereby, concurrently regulate incast traffic flow from multiple transmitters. Moreover, the receiver may update transmission rates over time by sending multiple pull mode request packets over time to one or more transmitters. In this manner, transmission rates may be controlled by the receiver over time and per transmitter or per connection.

Figure 4:
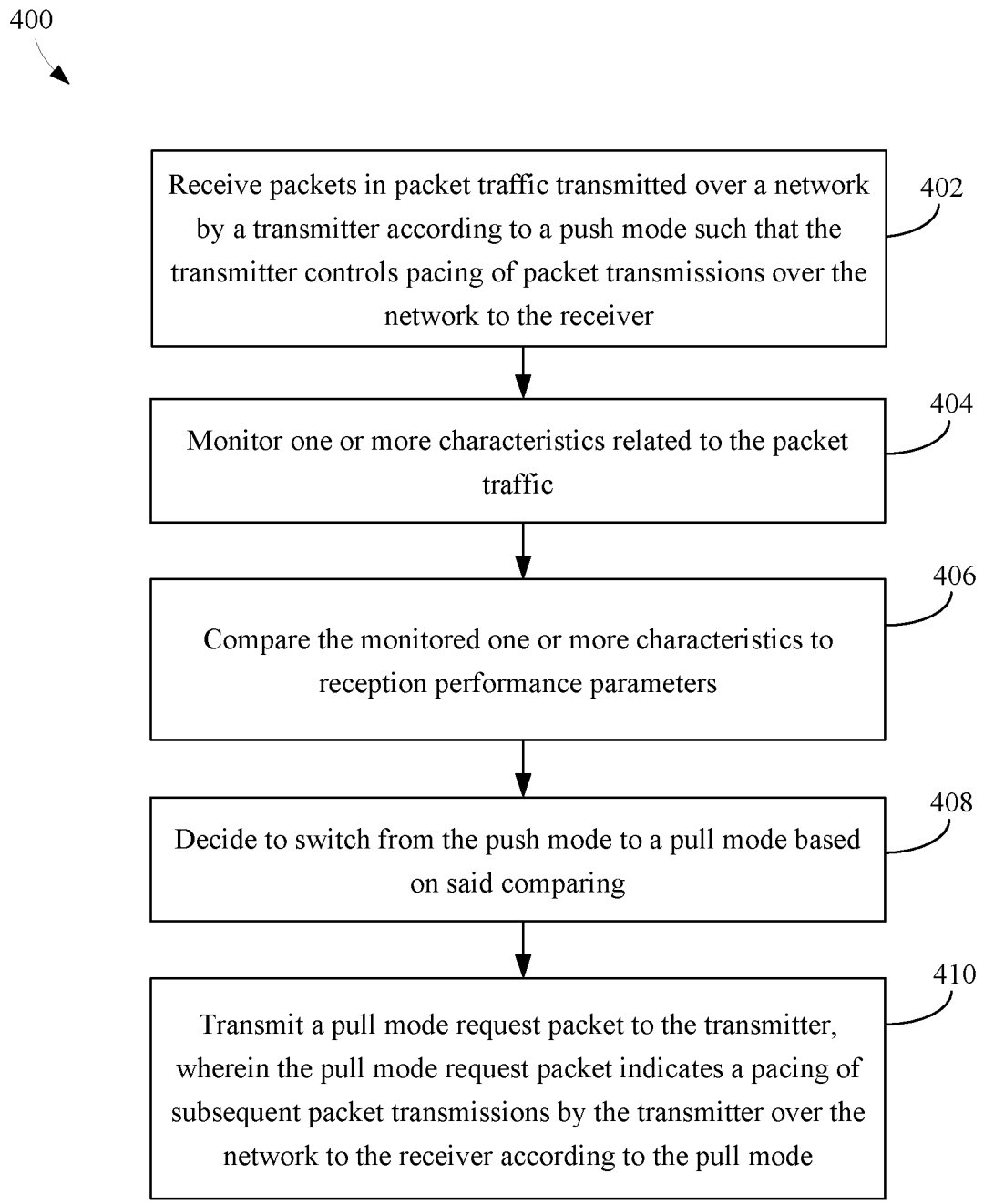
FIG. 4 is a flowchart of a method in a receiver for controlling the pacing of packet transmissions from a transmitter to the receiver, according to an example embodiment.

Receiver 104 may operate in various ways to perform its functions. For instance, FIG. 4 is a flowchart 400 of a method in a receiver for controlling the pacing of packet transmissions from a transmitter to the receiver, according to an example embodiment. In some embodiments, flowchart 400 may be performed as part of flowchart 200 (FIG. 2), such as after step 202. In an embodiment, receiver 104 may operate according to flowchart 400. Flowchart 400 is described as follows with reference to FIGS. 1 and 3.

Flowchart 400 begins with step 402. In step 402, packets are received in packet traffic transmitted over a network by a transmitter according to a push mode such that the transmitter controls pacing of packet transmissions over the network to the receiver. For example, transmitter 128 may be configured to transmit packet transmissions 340 from send buffer 338 according to entries in transmitter connection tracking table 330, via network fabric 120, to receiver 104. Initially transmitter 128 may be configured to transmit the packets in a push mode (i.e., an eager mode). When operating in the push mode, transmitter 128 may be configured pace packet transmissions 340 at a rate that is based on a policy provided by higher level software of NIC endpoint 122 or computing device 182. A connection may be established between transmitter 128 and receiver 104, where receiver connection tracking table 312 may be configured to maintain the connection for receiver 104. Transmitter connection tracking table 330 may be configured to maintain the connection for transmitter 128. Receiver 104 may be configured to receive the transmitted packets in packet traffic 308, store the received packets in inflight reorder buffer 310, and populate receiver connection tracking table 312 with metadata or packet header information of the received packets.

In step 404, one or more characteristics related to the packet traffic may be monitored. For example, pull mode manager 106 may be configured to monitor the one or more characteristics related to receiving and processing packet traffic 308 to determine if network endpoint 102 is running low on resources. The characteristics may include one or more of the status of network resources (e.g., congestion, bandwidth, burst rate, etc.), receiver 104 resources (e.g., receiver connection tracking table 312 capacity, timers, pointers, etc.), NIC endpoint 122 resources (e.g., ingress queues, inflight reorder buffers, other buffers and memory, etc.), and/or computing device 180 resources (e.g., memory, bus availability, etc.). Additional monitored characteristics may include received packet size, received packet sequence numbers, missing packet sequence numbers, pointers, timers, SELACKs, and/or NACKs (e.g., indicating packet drops). Sustained packet drops or explicit congestion notification (ECN) markings from switch fabric 120 may be observed by pull mode manager 106. A lack of many different resources on the receiving end may result in packet drops. In some embodiments, packet drops might appear as a network congestion event, even though the problem causing the packet drops occurred at NIC endpoint 102. Packet drops may also occur where data consumers (i.e., resources) are not be able to keep up with the incoming rate of packet data. For example, the consumers of the data may comprise a CPU behind a PCIe bus of computing device 180, or a locally attached accelerator (not shown). Moreover, bursty traffic and sustained small packets can back up the ingress queues resulting in tail drop, which also may be classified as running out of NIC endpoint 102 resources. Pull mode manager 106 may be configured to populate reception context data 314 with the one or more characteristics related to the packet traffic.

In step 406, the monitored one or more characteristics may be compared to reception performance parameters. For example, pull mode manager 106 may be configured to compare the one or more monitored characteristics (e.g., from reception context data 314) to one or more reception performance parameters 316. The reception performance parameters 316 may comprise indicators and/or thresholds relating to the monitored one or more characteristics. For example, an parameter threshold may correspond to the ability of one or more resources to receive and process packets from one or more transmitters (e.g., transmitter 128 or 148). Also, crossing a reception performance threshold for one or more resources may indicate when an adequate versus an impaired quality of service can be expected.

In step 408, based on the comparison, a decision may be made to switch from the push mode to a pull mode. For example, pull mode manager 106 may use criteria that applies to the monitored one or more characteristics (described above) at receiver 104, to decide to switch from the push mode to the pull mode. For example, the criteria for changing to pull mode may include (1) detecting a specified level of packet drops that is sustained beyond a specified threshold of time, (2) receiving an explicit congestion notification (ECN) marking from switch fabric 120, or (3) detecting that a level of availability of a particular resource falls below a threshold. The criteria used to switch from pull mode to push mode may be based on potential, impending, or detected reception impairments. Pull mode manager 106 may decide to switch to the pull mode based on availability or status of any of the previous described resources at NIC endpoint 102. The pull mode may be applied to one or more connections specified in receiver connection tracking table 312.

In step 410, a pull mode request packet is transmitted to the transmitter, where the pull mode request packet indicates a pacing of subsequent packet transmissions by the transmitter over the network to the receiver according to the pull mode. For example, in response to pull mode manager 106 deciding to switch from the push mode to the pull mode, transmissions manager 318 may be configured to control transmitter 108 to transmit pull mode request packet 320 to transmitter 128 via network fabric 120, and receiver 124. Pull mode request packet 320 may include control information such as a pacing (e.g., a bit rate, packet count, packet sequence number range, etc.) of subsequent packet transmissions 340 by transmitter 128 over network fabric 120 to receiver 104 according to the pull mode. In some embodiments, rather than sending this pull mode request control information in a separate packet used only for the pull mode request, the pull mode request control information may be included as part of another type of packet being transmitted to transmitter 108, for example, an acknowledgement (ACK) packet. Such an ACK packet, or another type of packet that carries the pull mode control information, may be referred to as the pull mode request packet 320.

Various types of information may be carried in pull mode request packets 320. For example, a pull mode request packet 320 may specify to transmitter 128 (or other transmitters), a number of bytes to transmit to receiver 104, a rate of transmission to use, and/or an expected rate of transmission. Moreover, a pull mode request packet 320 may include a pause transmission indicator and/or how long to pause transmissions (e.g., in the form of a timer or semaphore). Transmitter 128 may stop its current transmissions upon receipt of this packet. Other pull mode request packets 320 may indicate to restart transmission from a specified packet sequence number. For example, pull mode manager 106 may keep track of the last good packet sequence number received before packets were dropped. Transmitter 128 may selectively retransmit the packets based on the sequence number (s) specified in the pull mode request packet. Moreover, transmitter 128 may continue transmission until a sequence number that may be specified in a pull mode request packet 320. Any packet received at receiver 104 with a sequence number greater than this specified number may be dropped. These sequence number bounds may be set in pull mode request packets 320 to enable the capacity of receiver 104 to successfully absorb the incoming data. If the receiver has the capacity to absorb more packets it can advertise a larger number. Receiver 104 may be configured to drop some packets it receives to avoid resource overflows.

In some embodiments, transmitter 128 (and/or other transmitters) may be configured to routinely start transmitting packets in the push mode. For example a set of packet transmissions may initially be sent at a rate determined by the transmitter. During push mode control, receiver 104 may be configured to monitor incoming packet traffic, compare it to programmed thresholds, and generate SELACKs or NACKs based on inflight reorder buffer 310 capabilities. Transmitter 128 may continue transmitting in this push mode until receiver 104 controls the transmitter to switch into a pull mode, where receiver 104 controls the transmission rates used by transmitter 128. As pull mode request packets 320 are sent in a best-effort fashion, transmitter 128 may continue to transmit packets according to the push mode after a pull mode request packet 320 sent by receiver 104 has been dropped in transmission in network fabric 120. In this circumstance, receiver 104 may be configured to drop such packets that are received post pull mode request and were transmitted according to the push mode, to avoid any resource overflows.

As described above, transmission of a pull mode request packet 320 to transmitter 128, or to other transmitters, may be reactive to network congestion detection and/or resource contention at receiver 104. Once receiver 104 and transmitter 128 switch into a pull mode of control of data transmissions, the mode of control may stay in the pull mode until a complete message has been transferred to receiver 104, or until a congestion event has been relieved. For example, the control mode may switch back to the push mode once the receiver's local resources are freed-up or network fabric 120 has reached a stable state. During pull mode control, pull mode manager 106 may be configured to continue to monitor characteristics related to incoming packet traffic 308 and continue to control transmitter 128 (and/or other transmitters) to update transmission rates using subsequent pull mode request packets 320. In some embodiments, subsequent pull mode request packets may be sent periodically, potentially with different transmission rates or bandwidths indicated in the requests. In this manner, pull mode manager 106 may improve the quality of reception performance at receiver 104 by adjusting transmission rates in response to detected, potential, or impending impairments in receiving and/or processing packets and packet data, as indicated in the monitored characteristics related to the packet traffic.

Figure 5:
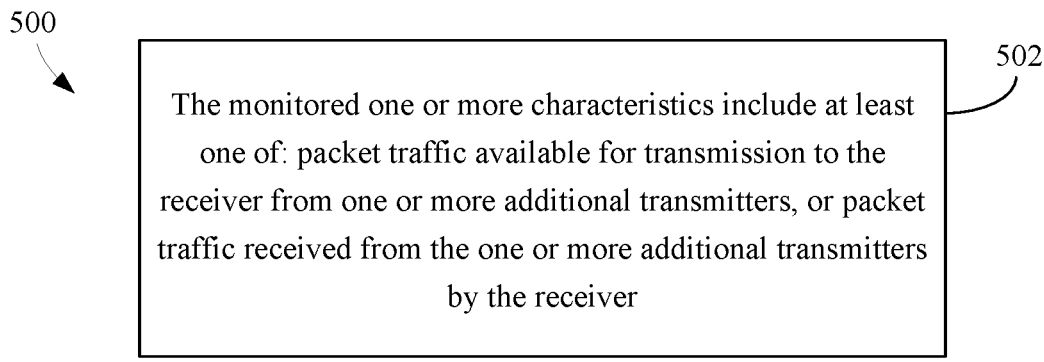
FIG. 5 is a flowchart of a method for monitoring one or more characteristics related to packet traffic from multiple receivers, according to an example embodiment.

Pull mode manager 106 may operate in various ways to perform its functions. For instance, FIG. 5 is a flowchart 500 of a method for monitoring one or more characteristics related to packet traffic from multiple receivers, according to an example embodiment. Flowchart 500 may be performed as part of flowchart 400 (FIG. 4), such as during step 404. In an embodiment, pull mode manager 106 may operate according to flowchart 500. Flowchart 500 is described as follows with reference to FIGS. 1 and 3.

Flowchart 500 includes step 502. In step 502, the monitored one or more characteristics include at least one of: packet traffic available for transmission to the receiver from one or more additional transmitters, or packet traffic received from the one or more additional transmitters by the receiver. For example, pull mode manager 106 may be configured to monitor current packet traffic coming transmitter 128, and look for packet traffic from additional transmitters. Although only two transmitters 128 and 148 are shown for transmitting packet traffic to receiver 104, there may be additional such transmitters that are configured to transmit packets to receiver 104. Pull mode manager 106 may be configured to identify additional packet traffic available for transmission by monitoring new connections established in receiver connection tracking table 312 for communicating with transmitter 148 (or other transmitters). Alternatively, or in addition, pull mode manager may monitor new push mode requests (i.e., packet transmit requests) from transmitter 148 (or other transmitters). Furthermore, pull mode manager 106 may be configured to identify packet traffic received from the one or more additional transmitters (e.g. transmitter 148 or additional transmitters) by monitoring packet traffic 308.

Figure 6:
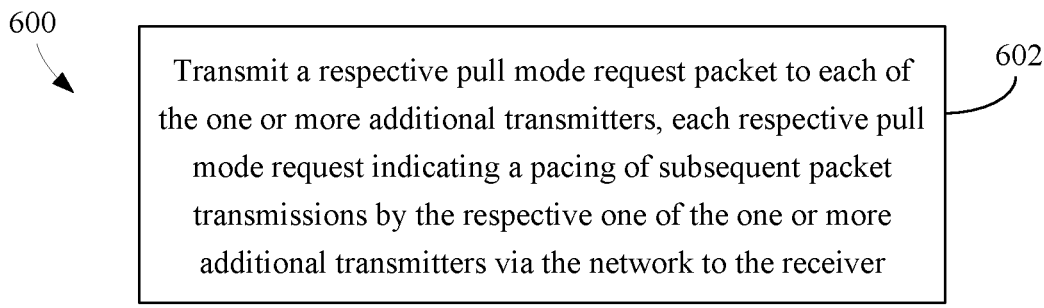
FIG. 6 is a flowchart of a method for a receiver to control packet transmissions from multiple transmitters by sending multiple pull mode request packets, each to a respective transmitter, according to an example embodiment.

Pull mode request manager 106 and transmit manager 318 may operate in various ways to perform their functions. For instance, FIG. 6 is a flowchart 600 of a method for a receiver to control packet transmissions from multiple transmitters by sending multiple pull mode request packets, each to a respective transmitter, according to an example embodiment.

Flowchart 600 may be performed as part of flowchart 400 (FIG. 4), such as during or after step 410. In an embodiment, pull mode manager 106 and/or transmission manager 318 may operate according to flowchart 600. Flowchart 600 is described as follows with reference to FIGS. 1 and 3.

Flowchart 600 includes step 602. In step 602, a respective pull mode request packet is transmitted to each of the one or more additional transmitters, where each respective pull mode request indicates a pacing of subsequent packet transmissions by the respective one of the one or more additional transmitters via the network to the receiver. For example, in the event multiple push mode request packets (or multiple transmit requests) are received by receiver 104 from multiple transmitters (e.g., an incast flow from transmitter 128 and transmitter 148 alone or with one or more additional transmitters (not shown)), pull mode manager 106 may be configured to pace packet traffic for each of those transmitters. Pull mode manager 106 and transmission manager 318 may be configured to transmit individual pull mode request packets 320, via transmitter 108, to each requesting transmitter to regulate its respective packet transmissions rate, and thereby, control the incast. Pull mode manager 106 may determine which transmitters are allowed to transmit packets to receiver 104 and at which rate each transmitter may transmit at, where different transmitters may transmit packets at different rates. Transmission manager 318 may control transmitter 108 to transmit the multiple pull mode request packets 320 to their respective transmitters (e.g., transmitter 128 and transmitter 148 alone or with one or more additional transmitters), via network fabric 120.

Figure 7:
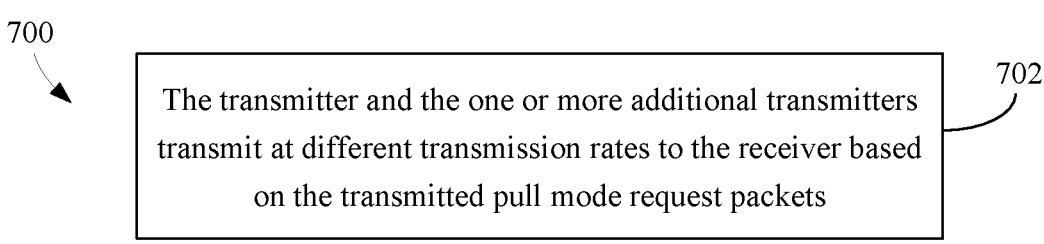
FIG. 7 is a flowchart of a method for transmitting packets from multiple transmitters to the same receiver at different rates based on pull mode control by the receiver, according to an example embodiment.

Transmitter 128 and transmitter 148 alone or with one or more additional transmitters may operate in various ways to perform their functions. For instance, FIG. 7 is a flowchart 700 of a method for transmitting packets from multiple transmitters to the same receiver at different rates based on pull mode control by the receiver, according to an example embodiment. Flowchart 700 may be performed as part of flowchart 600 (FIG. 6), such as after step 602. In an embodiment, transmitter 128 and transmitter 148 alone or with one or more additional transmitters may operate according to flowchart 700. Flowchart 700 is described as follows with reference to FIGS. 1 and 3.

Flowchart 700 begins with step 702. In step 702, the transmitter and the one or more additional transmitters transmit at different transmission rates to the receiver based on the transmitted pull mode request packets. For example, transmitter 128 and transmitter 148 alone or with one or more additional transmitters may each be configured to receive and respond to their respective pull mode request packets by transmitting packets to receiver 104 via network fabric 120 at their respective rates (e.g., different rates) according to specifications of their respective pull mode request packets.

Figure 8:
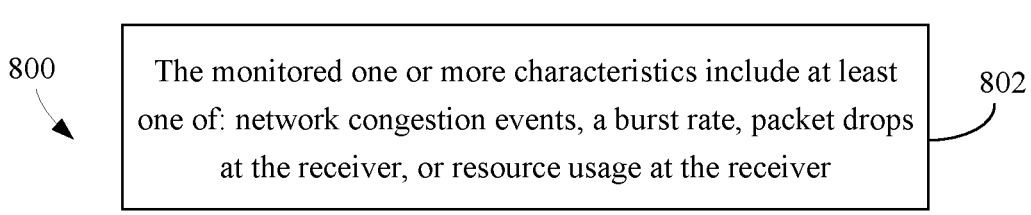
FIG. 8 is a flowchart of a method in a receiver for monitoring characteristics related to received packet traffic, according to an example embodiment.

Pull mode manager 106 may operate in various ways to perform its functions. For instance, FIG. 8 is a flowchart 800 of a method in a receiver for monitoring characteristics related to received packet traffic, according to an example embodiment. Flowchart 800 may be performed during step 404 of flowchart 400 (FIG. 4), for example. In an embodiment, pull mode manager 106 may operate according to flowchart 800. Flowchart 800 is described as follows with reference to FIGS. 1 and 3.

Flowchart 800 includes step 802. In step 802, the monitored one or more characteristics include at least one of: network congestion events, a burst rate, packet drops at the receiver, or resource usage at the receiver. For example, pull mode manager 106 may be configured to monitor packet traffic 308 and/or various resource utilization of receiver 104, NIC endpoint 102, and computing device 180 (as described above). In this regard, pull mode manager 106 may be configured to monitor network fabric 120 congestion events, a burst rate or bandwidth of network fabric 120, packet drops at receiver 104, or resource usage of resources for receiver 104.

Figure 9:
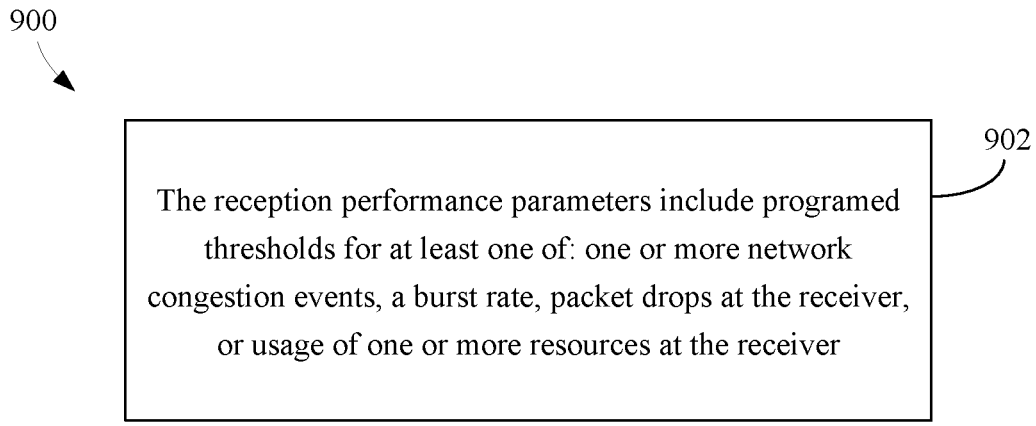
FIG. 9 is a flowchart of a method for monitoring one or more characteristics related to packet traffic, according to an example embodiment.

Pull mode manager 106 may operate in various ways to perform its functions. For instance, FIG. 9 is a flowchart 900 of a method for monitoring one or more characteristics related to packet traffic, according to an example embodiment. Flowchart 900 may be performed during step 406 of flowchart 400 (FIG. 4), for example. In an embodiment, pull mode manager 106 may operate according to flowchart 900. Flowchart 900 is described as follows with reference to FIGS. 1 and 3.

Flowchart 900 includes step 902. In step 902, the reception performance parameters include programed thresholds for at least one of: one or more network congestion events, a burst rate, packet drops at the receiver, or usage of one or more resources at the receiver. For example, pull mode manager 106 may be configured to compare the monitored one or more characteristics related to packet traffic to the reception performance parameters to determine when to switch to, maintain, or end pull mode control of transmission rates of packets transmitted to receiver 104.

Figure 10:
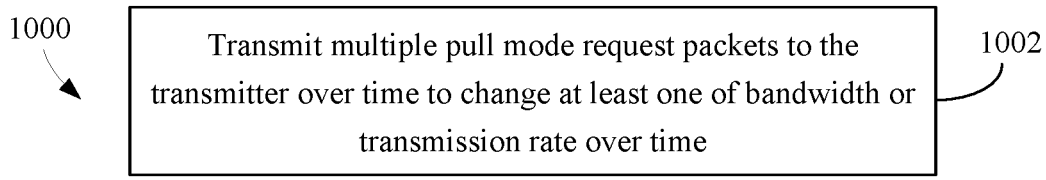
FIG. 10 is a flowchart of a method for receiver control of packet transmissions by transmitting, from the receiver to the transmitter, multiple pull mode request packets over time, according to an example embodiment.

Pull mode manager 106 and/or transmission manager 318 may operate in various ways to perform their functions. For instance, FIG. 10 is a flowchart 1000 of a method for receiver control of packet transmissions by transmitting, from the receiver to the transmitter, multiple pull mode request packets over time, according to an example embodiment. Flowchart 1000 may be performed after step 410 of flowchart 400 (FIG. 4), for example. In an embodiment, pull mode manager 106 and/or transmission manager 318 may operate according to flowchart 1000. Flowchart 1000 is described as follows with reference to FIGS. 1 and 3.

Flowchart 1000 includes step 1002. In step 1002, multiple pull mode request packets are transmitted to the transmitter over time to change at least one of bandwidth or transmission rate over time. For example, once pull mode manager 106 establishes pull mode control with transmitter 128, it may be configured to continue to operate in that mode until transmission of a message is complete, resources are freed-up, and/or network congestion is relieved. Until then, pull mode manager 106 may be configured to maintain packet transmission control in the pull mode. For example, pull mode manager 106 may continue to monitor one or more characteristics related to packet traffic 308 being received by receiver 108 and/or compare the monitored characteristics to reception performance parameters 316. Based on the results of the monitoring and/or comparison, pull mode manager 106 may be configured to decide to change the transmission rate and/or other aspects of transmission (e.g., a number of packets to send, the packet sequence number to begin a packet flow with, etc.) of transmitter 128 (and/or other transmitters) and generate pull mode request packet 320 data accordingly. Transmission manager 318 may be configured to control transmitter 108 to transmit a pull mode request packet 320 to transmitter 128 to control subsequent packet transmissions 340 from transmitter 128 to receiver 104. Further subsequent pull mode request packets 320 may be generated and transmitted to transmitter 128 to modify transmission rates and control transmissions from transmitter 128 over time. These subsequent packet transmission may be sent periodically or aperiodically, in response to changes in characteristics related to received packet traffic.

Figure 11:
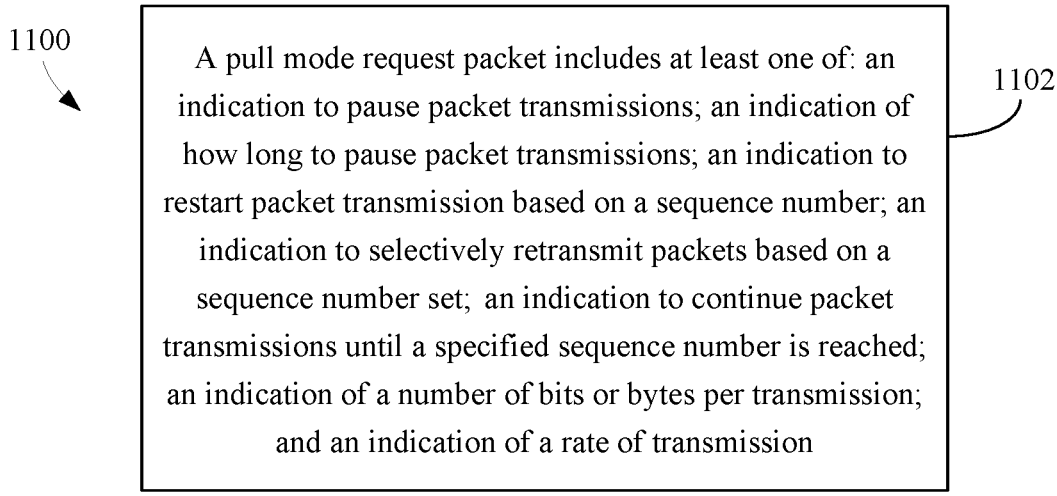
FIG. 11 is a flowchart of a method in a receiver for controlling aspects of transmissions of a transmitter based on contents of pull mode request packets sent to the transmitter, according to an example embodiment.

Pull mode manager 106 and/or transmission manager 318 may operate in various ways to perform their functions. For instance, FIG. 11 is a flowchart 1100 of a method in a receiver for controlling aspects of transmissions of a transmitter based on contents of pull mode request packets sent to the transmitter, according to an example embodiment. Flowchart 1100 may be performed during step 408 of flowchart 400 (FIG. 4), for example. In an embodiment, pull mode manager 106 and/or transmission manager 318 may operate according to flowchart 1100. Flowchart 1100 is described as follows with reference to FIGS. 1 and 3.

Flowchart 1100 includes step 1102. In step 1102, a pull mode request packet includes at least one of: an indication to pause packet transmissions, an indication of how long to pause packet transmissions, an indication to restart packet transmission based on a sequence number, an indication to selectively retransmit packets based on a sequence number set, an indication to continue packet transmissions until a specified sequence number is reached, an indication of a number of bits or bytes per transmission, and an indication of a rate of transmission. As described above, pull mode manager 106 may be configured to decide to switch from a push mode transmission control to a pull mode transmission control for packet transmissions 340 of transmitter 128 (and/or of additional transmitters), and may generate pull mode request packet 320 information to initiate and/or change the transmission rate and/or other aspects of transmission. In response, transmissions manager 318 may be configured to control transmitter 108 to transmit pull mode request packet 320 to transmitter 128 where pull mode request packet 320 may include at least one of the above described items.

Figure 12:
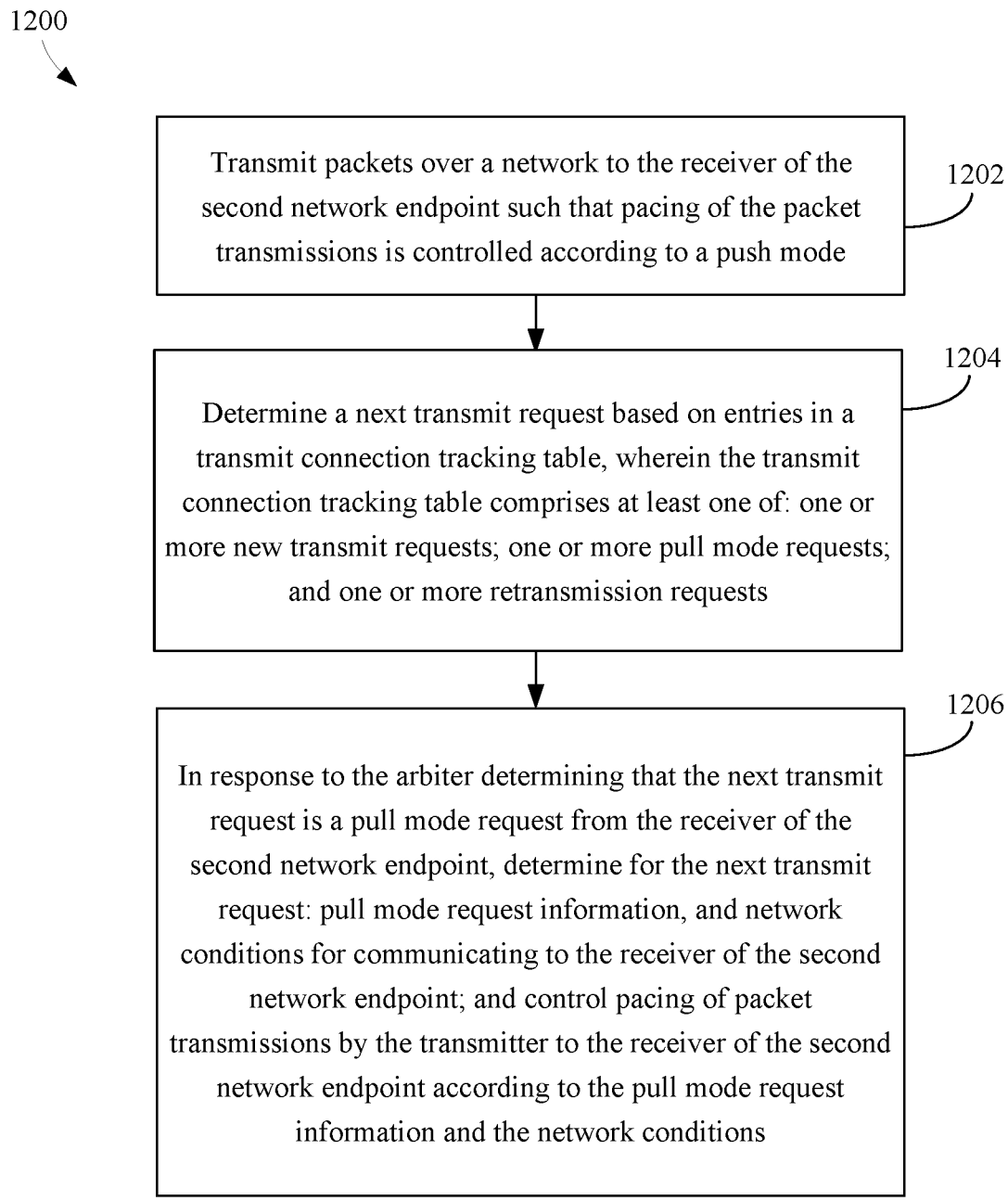
FIG. 12 is a flowchart of a method in a transmitter of a first network endpoint for transmitting packets according to pull mode control packets from a receiver of a second network endpoint, according to an example embodiment.

Transmitter 128 may operate in various ways to perform its functions. For instance, FIG. 12 is a flowchart 1200 of a method in a transmitter of a first network endpoint for transmitting packets according to pull mode control packets from a receiver of a second network endpoint, according to an example embodiment. In some embodiments, flowchart 1200 may be performed in conjunction with flowchart 400 (FIG. 4). In an embodiment, transmitter 128 may operate according to flowchart 1200. Flowchart 1200 is described as follows with reference to FIGS. 1 and 3.

Flowchart 1200 begins with step 1202. In step 1202, packets may be transmitted over a network to a receiver of a second network endpoint such that pacing of the packet transmissions is controlled by the transmitter according to a push mode. For example, transmitter 128 may be configured to transmit packets (e.g., packet transmissions 340) over network fabric 120 to receiver 104 of network endpoint 102.

Pacing of packet transmissions from transmitter 128 may be controlled by transmitter 128.

In step 1204, a next transmit request may be determined based on entries in a transmit connection tracking table, wherein the transmit connection tracking table comprises at least one of: one or more new transmit requests, one or more pull mode requests, and one or more retransmission requests. For example, arbiter 332 may be configured to determine a next transmit request in order to schedule the next packet or next plurality of packets to be transmitted via network fabric 120 to a receiver such as receiver 104. Transmitter connection tracking table 330 may be configured to indicate which request is next in line to be processed and various properties of a corresponding packet flow. Arbiter 332 may be configured to interface with transmitter connection tracking table 330 and select the next outstanding transmit request from the table, where the table may include at least one of a new transmit request, a pull mode request, and a retransmission request. New transmit requests may be generated by application 130, or another application, in order to have messages transmitted to application 110 of computing device 180. The pull mode requests may be generated by pull mode manager 106 and transmitted to transmitter 128 via network fabric 120 for controlling a transmissions rate or other aspects of transmitting packets by transmitter 128. The retransmission requests may be based on received NACKs or SELACKs, or a timer.

In step 1206, in response to the arbiter determining that the next transmit request is a pull mode request from the receiver of the second network endpoint, determine for the next transmit request: pull mode request information, and network conditions for communicating to the receiver of the second network endpoint; and control pacing of packet transmissions by the transmitter to the receiver of the second network endpoint according to the pull mode request information and the network conditions. For example, arbiter 332 may be configured to determine transmission parameters received in a pull mode request packet 320 from receiver 104. The transmission parameters may include one or more of a rate of transmission to use, a number of bytes to transmit, an expected rate of transmission, a pause transmission indicator, an indicator of how long to pause transmissions that may be in the form of a timer or semaphore, an indicator for restarting transmissions from a specified packet sequence number, other packet sequence number bounds, etc. Transmitter may 128 may be configured to control pacing of packet transmissions to the receiver 104 according to the transmission parameters of the selected pull mode request. In some embodiments, transmitter 128 may be configured to also consider quality of service (QoS) across one or more send queues based on, for example, data center quantized congestion notification (DCQCN), or other indicators, when scheduling packet transmissions to receiver 104. Moreover, transmitter 128 may be configured to service multiple pull mode request packets from multiple receiver's without causing head-of-line (HOL) blocking. In this manner, transmitter 128 may improve the quality of reception performance at receiver 104 or other receivers by adjusting transmission rates or other transmission parameters in accordance with pull mode request packets received from receiver 104 or the other receivers.

III. Example Computer System Implementation

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, systems 100 and 300 along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 13:
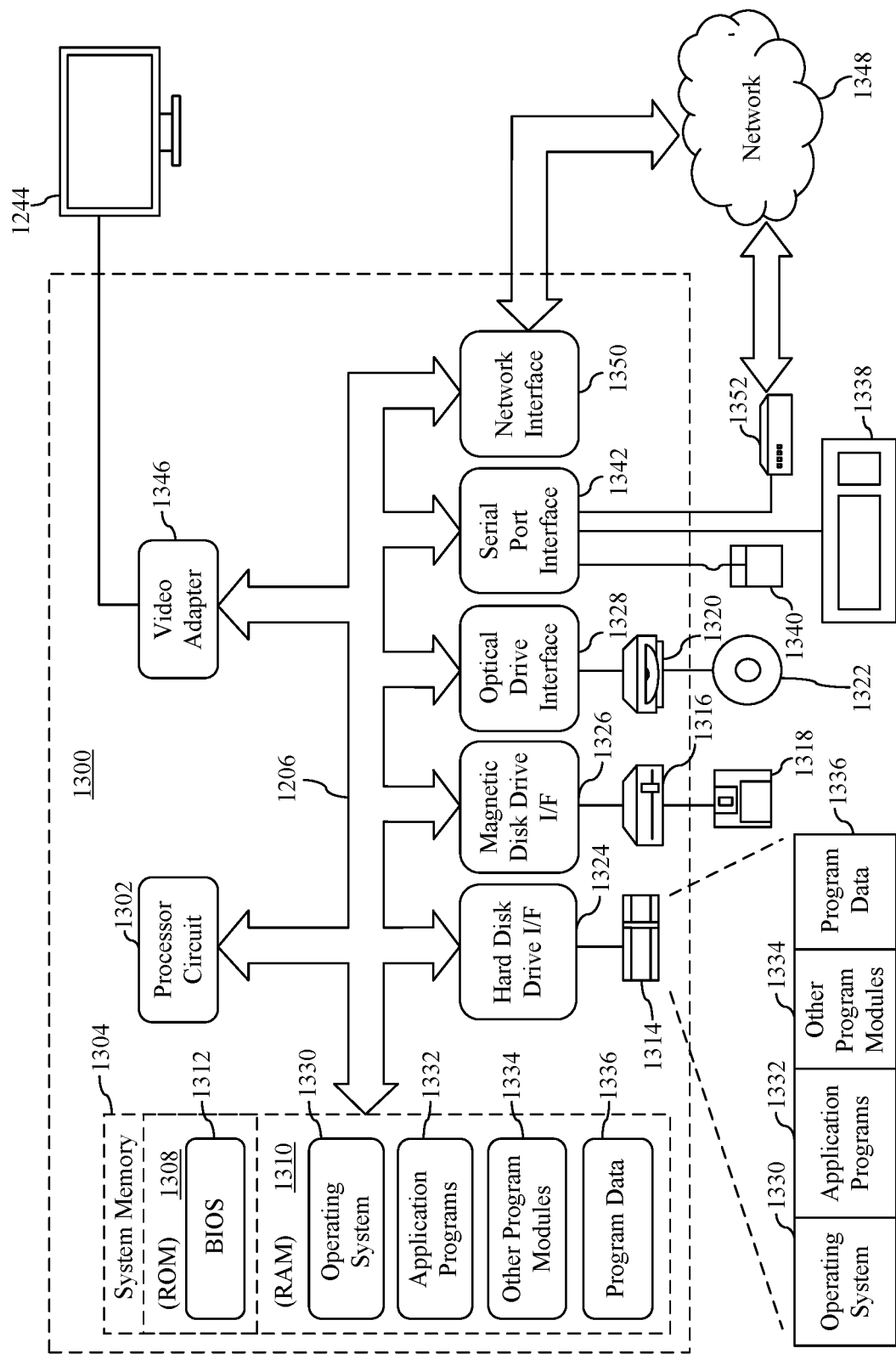
FIG. 13 is a block diagram of an example processor-based computer system that may be used to implement various embodiments.

FIG. 13 is a block diagram of an example processor-based computer system 1300 that may be used to implement various embodiments. Computing device 180, computing device 182, and computing device 184 may each include any type of computing device, mobile or stationary, such as a desktop computer, a server, a video game console, etc. For example, computing device 180, computing device 182, and computing device 184 may each be any type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™ Oculus Rift® by Oculus VR, LLC, etc.), a stationary computing device such as a desktop computer or PC (personal computer), a gaming console/system (e.g., Microsoft Xbox®, Sony PlayStation®, Nintendo Wii® or Switch®, etc.), etc.

Computing device 180, computing device 182, and computing device 184, may each be implemented in one or more computing devices containing features similar to those of computing device 1300 in stationary or mobile computer embodiments and/or alternative features. The description of computing device 1300 provided herein is provided for purposes of illustration, and is not intended to be limiting. Embodiments may be implemented in further types of computer systems, as would be known to persons skilled in the relevant art(s).

As shown in FIG. 13, computing device 1300 includes one or more processors, referred to as processor circuit 1302, a system memory 1304, and a bus 1306 that couples various system components including system memory 1304 to processor circuit 1302. Processor circuit 1302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1302 may execute program code stored in a computer readable medium, such as program code of operating system 1330, application programs 1332, other programs 1334, etc. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random-access memory (RAM) 1310. A basic input/output system 1312 (BIOS) is stored in ROM 1308.

Computing device 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1330, one or more application programs 1332, other programs 1334, and program data 1336. Application programs 1332 or other programs 1334 may include, for example, computer program logic (e.g., computer program code or instructions) for implementing NIC endpoint 102, NIC, NIC endpoint 122, NIC endpoint 142, transmitter 108, receiver 104, transmitter 128, receiver 124, transmitter 148, receiver 144, memory 112, memory 132, memory 152, pull mode manager 106, inflight reorder buffer 310, receiver connection tracking table 312, reception context data 314, transmission manager 318, transmitter connection tracking table 330, arbiter 332, pull mode transmissions manager 334, RAM 336, send buffer 338, transmitter connection tracking table 350, arbiter 352, pull mode transmissions manager 354, RAM 356, send buffer 358, and any one or more of flowcharts 200, 400, 500, 600, 700, 800, 900, 1000, 1100, 1200 (including any step thereof), and/or further embodiments described herein. Program data 1336 may include, pull mode request packet 320, packet traffic 308, packet transmissions 340, reception context data 314, pull mode request 322, and/or further embodiments described herein.

A user may enter commands and information into computing device 1300 through input devices such as keyboard 1338 and pointing device 1340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1302 through a serial port interface 1342 that is coupled to bus 1306, but may be connected by other interfaces, such as a parallel port, game port, or a universal serial bus (USB).

A display screen 1344 is also connected to bus 1306 via an interface, such as a video adapter 1346. Display screen 1344 may be external to, or incorporated in computing device 1300. Display screen 1344 may display information, as well as being a user interface for receiving user commands and/or other information (e.g., by touch, finger gestures, virtual keyboard, etc.). In addition to display screen 1344, computing device 1300 may include other peripheral output devices (not shown) such as speakers and printers.

Computing device 1300 is connected to a network 1348 (e.g., the Internet) through an adaptor or network interface 1350, a modem 1352, or other means for establishing communications over the network. Modem 1352, which may be internal or external, may be connected to bus 1306 via serial port interface 1342, as shown in FIG. 13, or may be connected to bus 1306 using another interface type, including a parallel interface.

As used herein, the terms "computer program medium," "computer-readable medium," and "computer-readable storage medium" are used to refer to physical hardware media such as the hard disk associated with hard disk drive 1314, removable magnetic disk 1318, removable optical disk 1322, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1332 and other programs 1334) may be stored on the hard disk, magnetic disk, optical disk, ROM, RAM, or other hardware storage medium. Such computer programs may also be received via network interface 1350, serial port interface 1342, or any other interface type. Such computer programs, when executed or loaded by an application, enable computing device 1300 to implement features of embodiments discussed herein. Accordingly, such computer programs represent controllers of computing device 1300.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Examples and Advantages

In an embodiment, a system for controlling packet flow by a receiver of a network endpoint comprises a receiver configured to receive packets in packet traffic transmitted over a network by a transmitter according to a push mode such that the transmitter controls pacing of packet transmissions over the network to the receiver. A pull mode manager is configured to monitor one or more characteristics related to the packet traffic, compare the monitored one or more characteristics to reception performance parameters, and decide to switch from the push mode to a pull mode based on said comparing. A transmission manager is configured to transmit a pull mode request packet to the transmitter. The pull mode request packet indicates a pacing of subsequent packet transmissions by the transmitter over the network to the receiver according to the pull mode.

In an embodiment of the foregoing system, the monitored one or more characteristics include at least one of: packet traffic available for transmission to the receiver from one or more additional transmitters, or packet traffic received from the one or more additional transmitters by the receiver.

In an embodiment of the foregoing system, the transmission manager is further configured to: transmit a respective pull mode request packet to each of the one or more additional transmitters. Each respective pull mode request indicates a pacing of subsequent packet transmissions by the respective one of the one or more additional transmitters via the network to the receiver.

In an embodiment of the foregoing system, the transmitter and the one or more additional transmitters transmit at different transmission rates to the receiver based on the transmitted pull mode request packets.

In an embodiment of the foregoing system, the monitored one or more characteristics include at least one of: network congestion events, a burst rate, packet drops at the receiver, or resource usage at the receiver.

In an embodiment of the foregoing system, the reception performance parameters include programed thresholds for at least one of: one or more network congestion events, a burst rate, packet drops at the receiver, or usage of one or more resources at the receiver.

In an embodiment of the foregoing system, the pull mode request packet indicates an expected transmission rate in at least one of bytes or bandwidth.

In an embodiment of the foregoing system, the transmission manager is further configured to transmit multiple pull mode request packets to the transmitter over time to change at least one of bandwidth or transmission rate over time.

In an embodiment of the foregoing system, the transmission manager is further configured to: transmit a push mode request packet when transfer of a message is complete, or results of the comparison indicate that a congestion event is relieved or packet handling resources are available for push mode traffic.

In an embodiment of the foregoing system, the transmitter arbitrates between new transmit send requests, receiver based pull requests, and retransmission requests.

In an embodiment of the foregoing system, a pull mode request packet includes at least one of: an indication to pause packet transmissions, an indication of how long to pause packet transmissions, an indication to restart packet transmission based on a sequence number, an indication to selectively retransmit packets based on a sequence number set, an indication to continue packet transmissions until a specified sequence number is reached, an indication of a number of bits or bytes per transmission, and an indication of a rate of transmission.

In an embodiment, a method for controlling packet flow by a receiver of a network endpoint comprises receiving packets in packet traffic transmitted over a network by a transmitter according to a push mode such that the transmitter controls pacing of packet transmissions over the network to the receiver. One or more characteristics related to the packet traffic are monitored. The monitored one or more characteristics are compared to reception performance parameters. A decision to switch from the push mode to a pull mode is based on the comparison. A pull mode request packet is transmitted to the transmitter, where the pull mode request packet indicates a pacing of subsequent packet transmissions by the transmitter over the network to the receiver according to the pull mode.

In an embodiment of the foregoing method, the monitored one or more characteristics include at least one of: packet traffic available for transmission to the receiver from one or more additional transmitters, or packet traffic received from the one or more additional transmitters by the receiver.

In an embodiment of the foregoing method, a respective pull mode request packet is transmitted to each of the one or more additional transmitters, where each respective pull mode request indicates a pacing of subsequent packet transmissions by the respective one of the one or more additional transmitters via the network to the receiver.

In an embodiment of the foregoing method, the transmitter and the one or more additional transmitters transmit at different transmission rates to the receiver based on the transmitted pull mode request packets.

In an embodiment of the foregoing method, the monitored one or more characteristics include at least one of: network congestion events, a burst rate, packet drops at the receiver, or resource usage at the receiver.

In an embodiment of the foregoing method, the reception performance parameters include programed thresholds for at least one of: one or more network congestion events, a burst rate, packet drops at the receiver, or usage of one or more resources at the receiver.

In an embodiment of the foregoing method, multiple pull mode request packets are transmitted to the transmitter over time to change at least one of bandwidth or transmission rate over time.

In an embodiment of the foregoing method, a pull mode request packet includes at least one of: an indication to pause packet transmissions, an indication of how long to pause packet transmissions, an indication to restart packet transmission based on a sequence number, an indication to selectively retransmit packets based on a sequence number set, an indication to continue packet transmissions until a specified sequence number is reached, an indication of a number of bits or bytes per transmission, and an indication of a rate of transmission.

In an embodiment, a system for controlling packet transmissions in a transmitter of a first network end point in response to a pull mode request packet from a receiver of a second network endpoint comprises the transmitter of the first network endpoint. The transmitter of the first network endpoint is configured to transmit packets over a network to the receiver of the second network endpoint such that pacing of the packet transmissions is controlled according to a push mode. An arbiter configured to determine a next transmit request based on entries in a transmit connection tracking table. The transmit connection tracking table comprises at least one of: one or more new transmit requests, one or more pull mode requests, and one or more retransmission requests. A pull mode transmit manager configured to, in response to the arbiter determining that the next transmit request is a pull mode request from the receiver of the second network endpoint, determine for the next transmit request: pull mode request information, and network conditions for communicating to the receiver of the second network endpoint. Pacing of packet transmissions by the transmitter to the receiver of the second network endpoint is controlled according to the pull mode request information and the network conditions.

V. Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A system for controlling packet flow by a receiver of a first network endpoint, the system comprising:
the receiver of the first network endpoint communicatively coupled to a plurality of network endpoints via a network, the receiver configured to:
receive packets in packet traffic transmitted over the network by a transmitter of a second network endpoint of the plurality of network endpoints according to a push mode of the transmitter such that the transmitter controls pacing of packet transmissions over the network to the receiver;
a pull mode manager of the receiver of the first network endpoint configured to:
monitor one or more characteristics related to network traffic congestion or receiver resource contention during the push mode of the transmitter;
compare the monitored one or more characteristics related to network traffic congestion or receiver resource contention during the push mode of the transmitter to reception performance parameters; and
decide to switch from the push mode to a pull mode based on at least said comparing, wherein the criteria for deciding to switch applies to the monitored one or more characteristics related to network traffic congestion or receiver resource contention; and
a transmission manager of the receiver of the first network endpoint configured to:
transmit a pull mode request packet to the transmitter, wherein the pull mode request packet comprises pacing control information for adjusting a rate or aspects of packets in subsequent packet transmissions by the transmitter over the network to the receiver according to the pull mode.

2. The system of claim 1, wherein the monitored one or more characteristics include at least one of:
packet traffic available for transmission to the receiver from one or more additional transmitters; or
packet traffic received from the one or more additional transmitters by the receiver.

3. The system of claim 1, wherein the transmission manager is further configured to:
transmit a respective pull mode request packet comprising respective pacing control information for adjusting a rate or aspects of packets in subsequent packet transmissions to each of one or more additional transmitters thereby concurrently regulating incast traffic flow from each of the transmitter and the one or more additional transmitters via the network to the receiver.

4. The system of claim 3, wherein the transmitter and the one or more additional transmitters transmit at different transmission rates to the receiver based on the transmitted pull mode request packets.

5. The system of claim 1, wherein the monitored one or more characteristics include at least one of:
network congestion events,
a burst rate,
packet drops at the receiver, or
resource usage at the receiver.

6. The system of claim 1, wherein the reception performance parameters include programed thresholds for at least one of:
one or more network congestion events,
a burst rate,
packet drops at the receiver, or
usage of one or more resources at the receiver.

7. The system of claim 1, wherein the pull mode request packet indicates an expected transmission rate in at least one of bytes or bandwidth.

8. The system of claim 1, wherein the transmission manager is further configured to:
transmit multiple pull mode request packets to the transmitter over time to change at least one of bandwidth or transmission rate over time.

9. The system of claim 1, wherein the transmission manager is further configured to:
transmit a push mode request packet when transfer of a message is complete or results of the comparison indicate that a congestion event is relieved or packet handling resources are available for push mode traffic.

10. The system of claim 1, wherein the transmitter arbitrates between new transmit send requests, receiver based pull requests, and retransmission requests.

11. The system of claim 1, wherein a pull mode request packet includes at least one of:
an indication to pause packet transmissions;
an indication of how long to pause packet transmissions;
an indication to restart packet transmission based on a sequence number;
an indication to selectively retransmit packets based on a sequence number set;
an indication to continue packet transmissions until a specified sequence number is reached;
an indication of a number of bits or bytes per transmission; and
an indication of a rate of transmission.

12. A method for controlling packet flow by a receiver of a first network endpoint, the method comprising:
receiving packets in packet traffic transmitted over a network by a transmitter of a second network endpoint of a plurality of network endpoints according to a push mode of the transmitter such that the transmitter controls pacing of packet transmissions over the network to the receiver;
monitoring, by the receiver of the first network endpoint, one or more characteristics related to network traffic congestion or receiver resource contention during the push mode of the transmitter;
comparing, by the receiver of the first network endpoint, the monitored one or more characteristics related to network traffic congestion or receiver resource contention during the push mode of the transmitter to reception performance parameters;

deciding, by the receiver of the first network endpoint, to switch from the push mode to a pull mode based on at least said comparing, wherein the criteria for deciding to switch applies to the monitored one or more characteristics related to network traffic congestion or receiver resource contention; and transmitting, by the receiver of the first network endpoint, a pull mode request packet to the transmitter, wherein the pull mode request packet comprises pacing control information for adjusting a rate or aspects of packets in subsequent packet transmissions by the transmitter over the network to the receiver according to the pull mode.

13. The method of claim 12, wherein the monitored one or more characteristics include at least one of:
packet traffic available for transmission to the receiver from one or more additional transmitters; or
packet traffic received from the one or more additional transmitters by the receiver.

14. The method of claim 12, further comprising:
transmitting a respective pull mode request packet comprising respective pacing control information for adjusting a rate or aspects of packets in subsequent packet transmissions to each of one or more additional transmitters thereby concurrently regulating incast traffic flow from each of the transmitter and the one or more additional transmitters via the network to the receiver.

15. The method of claim 14, wherein the transmitter and the one or more additional transmitters transmit at different transmission rates to the receiver based on the transmitted pull mode request packets.

16. The method of claim 12, wherein the monitored one or more characteristics include at least one of:
network congestion events,
a burst rate,
packet drops at the receiver, or
resource usage at the receiver.

17. The method of claim 12, wherein the reception performance parameters include programed thresholds for at least one of:
one or more network congestion events,
a burst rate,
packet drops at the receiver, or
usage of one or more resources at the receiver.

18. The method of claim 12, further comprising:
transmitting, by the receiver of the first network endpoint, multiple pull mode request packets to the transmitter over time to change at least one of bandwidth or transmission rate over time.

19. The method of claim 12, wherein a pull mode request packet includes at least one of:
an indication to pause packet transmissions;
an indication of how long to pause packet transmissions;
an indication to restart packet transmission based on a sequence number;
an indication to selectively retransmit packets based on a sequence number set;
an indication to continue packet transmissions until a specified sequence number is reached;
an indication of a number of bits or bytes per transmission; and
an indication of a rate of transmission.

20. A system for controlling packet transmissions in a transmitter of a first network endpoint in response to a pull mode request packet from a receiver of a second network endpoint, the system comprising:
the transmitter of the first network endpoint communicatively coupled to the receiver of the second network endpoint via a network, the transmitter of the first network endpoint configured to:
transmit packets over the network to the receiver of the second network endpoint such that pacing of the packet transmissions is controlled according to a push mode by the transmitter of the first network endpoint;
an arbiter of the transmitter of the first network endpoint configured to:
determine a next transmit request based on entries in a transmit connection tracking table, wherein the transmit connection tracking table comprises at least one of:
one or more new transmit requests;
one or more pull mode requests; and
one or more retransmission requests; and
a pull mode transmissions manager of the transmitter of the first network endpoint configured to:
in response to the arbiter determining that the next transmit request is a pull mode request from the receiver of the second network endpoint, determine for the next transmit request:
pull mode request information, and
network conditions for communicating to the receiver of the second network endpoint; and
control pacing of packet transmissions by the transmitter of the first network endpoint to the receiver of the second network endpoint according to the pull mode request information and the network conditions.

* * * * *